(12) United States Patent
Flynn

(10) Patent No.: US 6,437,866 B1
(45) Date of Patent: Aug. 20, 2002

(54) SYSTEM FOR ASSISTING CUSTOMERS IN SELECTING AN OPTIMUM COLOR COSMETIC PRODUCT

(75) Inventor: Madeline Flynn, Monroe, CT (US)

(73) Assignee: FD Management, Inc., Miami Lakes, FL (US)

( * ) Notice: Subject to any disclaimer, the term of this patent is extended or adjusted under 35 U.S.C. 154(b) by 0 days.

(21) Appl. No.: 09/543,711

(22) Filed: Apr. 5, 2000

Related U.S. Application Data

(60) Provisional application No. 60/142,600, filed on Jul. 7, 1999.

(51) Int. Cl.[7] .................................................. G01J 3/50
(52) U.S. Cl. ...................................... 356/402; 356/326
(58) Field of Search ................................ 356/319, 326, 356/328, 402

(56) References Cited

U.S. PATENT DOCUMENTS

| | | |
|---|---|---|
| 4,232,334 A | 11/1980 | Dyson |
| 4,539,585 A | 9/1985 | Spackova et al. |
| 4,909,632 A | 3/1990 | McFarlane ................ 356/402 |
| 4,911,544 A | 3/1990 | Walsh |
| 5,003,500 A | 3/1991 | Gerber |
| 5,478,238 A | 12/1995 | Gourtou et al. |
| 5,495,338 A | 2/1996 | Gouiou et al. |
| 5,622,692 A | 4/1997 | Rigg et al. |
| 5,751,829 A | 5/1998 | Ringland et al. |
| 5,785,960 A | 7/1998 | Rigg et al. |
| 5,945,112 A | 8/1999 | Flynn et al. |
| 6,000,407 A | 12/1999 | Galazin |

FOREIGN PATENT DOCUMENTS

| | | |
|---|---|---|
| DE | 3419568 | 11/1985 |
| EP | 0 226 959 | 7/1987 |
| EP | 1030267 | 8/2000 |
| FR | 2728982 | 12/1994 |
| JP | 63-80692 | * 4/1988 |
| JP | 11143352 | 5/1999 |
| WO | WO98/39735 | 9/1998 |
| WO | 98/58351 | 12/1998 |
| WO | WO99/23609 | 5/1999 |
| WO | WO01/04839 | 1/2001 |
| WO | WO01/04840 | 1/2001 |

OTHER PUBLICATIONS

Jecker, PC Magazine, Feb. 10, 1998, vol. 17, Issue 3, p. 340.*

* cited by examiner

Primary Examiner—F. L. Evans
(74) Attorney, Agent, or Firm—Abelman, Frayne & Schwab

(57) ABSTRACT

A method and system is provided for selecting a facial color cosmetic scheme. Apparatus employed for the system includes a computer module with a color monitor screen, a spectrophotometer for measuring a customer's skin color and a device for transferring the measured color information from the spectrophotometer to the computer module for entry into a program allowing visualization of a model face with skin color matched to that of the customer. The method includes measuring via spectrophotometer a customer's facial color, transmitting information on that color to the module for display on the model face appearing in the monitor, allowing the customer to select at least one color for an area of the face to be covered by a cosmetic product, and then displaying the visualized model face with the selected color. The system and method allow a customer to visualize the color combination without the necessity of using the actual color cosmetic on their own face for evaluation purposes.

5 Claims, 15 Drawing Sheets

FIG. 2

```
Beauty #_____ Name:[        ]Customer #[        ] ◇Verify Address and Cust Info!
Personal Information                                              [SEARCH]
Name                                                              [NEXT]
Last Name                                                         [PREVIOUS]
Address                                                           [CANCEL]
City                         State                                [CLOSE]
Zip Code         Telephone   Date of Birth    Day   Month
Profession
◇ Regular Client    ◇ Responds to Promotions    ◇ Responds to Mailing
```

```
                                        [OTHER INFORMATION]
                                        [PURCHASE HISTORY]
     (Overlay area - not to scale)      [PURCHASE INFORMATION]
                                        [PRODUCT OPTIONS]
                                        [MEASURE SKIN COLOR]
                                        [COLOR ANALYSIS]
                                        [SHOW COLOR]
```

FIG. 3

Customer follow up cards
    With clients information

| List of Names | |
|---|---|
| | Information |
| | On |
| | Selected |
| | Customer |
| | |
| | [ ] CALL COMPLETE |

[PRINT]
[CLOSE]

FIG. 4

```
                          MAINTENANCE
              [CALIBRATE SKIN READER]
              [LANGUAGE]
              [SET UP NEW STORE]
              [COLLECT DATA FOR MAIN OFFICE]
              [ACCEPT DATA FROM LOCAL STORES]
              [ADVANCED DATA MANAGEMENT]
              [CLOSE]
```

FIG. 5

| Skin Type | Age Profile | Beauty Habits | Fragrance | Other Brands | |
|---|---|---|---|---|---|
| ⊕ Sensitive | 15-20 | Make-up | Cologne | Biotherm | |
| | 20-30 | Cleanser/Toner | Perfume | Channel | |
| Normal to dry | 30-40 | Moisturizer | More than one | Clarins | |
| Normal to oily | 40-50 | Special Treat. | Bath line | Clinique | |
| Dry | 50+ | Sunscreens | | Dior | |
| Oily | | Body Products | | Estee Lauder | |
| | | | | H. Rubenstein | |
| | | | | Lancaster | |
| Special Preferences of Needs: | | | | Lancome | |
| Prefers fragrance free products | | | | Shiseido | [Accept] |
| | | | | YSL | |
| | | | | Other | |

OTHER INFORMATION

FIG. 6

| (Customer Name) | (Date) |
| --- | --- |
| Cyberface Screen With look #, and individual color name | [ANOTHER LOOK]<br>[SELECT LIPSTICK FAMILY]<br>[CONSULTANT'S CHOICE]<br>[PRODUCT OPTIONS]<br>[FOUNDATION]<br><br>PRODUCT SELECTIONS |

FIG. 7

| Purchase Information | | | |
| --- | --- | --- | --- |
| Today | 1 | JANE DOE | |
| (1) Lipstick | 125 | Purchased | |
| (1) Hydrolight | Bisque | Recommended | |
| (1) Mousse | Bisque | Not Appropriate | [Recommended]<br>[Purchase]<br>[Sample]<br>[Not Appropriate]<br>[Remove] |
| | | | |
| | | | |
| Date | 905 | JANE DOE | |
| (2) Ceramide Complex | | Sampled | |
| | | | |

| Today | | |
| --- | --- | --- |
| Look 001 | Plums | Recommended |
| Look 003 | Reds | Recommended |
| Look 004 | Naturals | Recommended |

FIG. 10

```
Collect Data for Main Office
┌─────────────────────────────────┬──────────────┐
│ Retrieve Monthly Data           │   January    │
│ To be sent to Main Office       │   February   │
│                                 │   March      │
│ Select Month(s) and press Collect│  April      │
│                                 │   May        │
│ Create Disk? Yes/No             │   June       │
├─────────────────────────────────┴──────────────┤
│ Connect? Yes/No                      [COLLECT] │
│                                      [CANCEL]  │
└────────────────────────────────────────────────┘
```

FIG. 11

```
Accept Data from Server

Store Name     Store Number     City Number
  ┌────────────┬────────────────┬──────────────┐
  │            │                │              │
  └────────────┴────────────────┴──────────────┘

Highlight to Select New Store

Available Stores │ A
                   │ B
                   │ C
                   │ D
                   │ E
                   │ F
                                      [CONNECT]
                                      [ACCEPT]
  Copy Data from Disk? Yes/No         [CANCEL]
```

FIG. 12

Lipstick Color Families

| Reds |
| Corals |
| Pinks |
| Naturals |
| Plums |

Enter Number of Lipstick

Enter Number of Look

[ACCEPT]
[CANCEL]

FIG. 13

Lipstick Family:Reds

022  Hollywood Red (Expert Fit)
033  Lush Red
244  Vintage
255  Gypsy
375  Baroque Red

[ACCEPT]
[CANCEL]

FIG. 14

| Today's Product Selections | | | |
|---|---|---|---|
| (#) Product Type | Color | | |
| ⊗ (1) Lipstick | 121 | Recommended | [Recommended] |
| ⊗ (2) Hydrolight | Bisque | Purchased | [Purchase] |
| ⊗ (1) Mousse | Bisque | Recommended | [Sample] |
| | | | [Not Appropriate] |
| ⊗ Look 321 | Reds | Recommended | [Remove] |
| ⊗ Look 496 | Plums | Recommended | [Print] |
| | | | [Accept] |

FIG. 15

| Purchase History | | |
|---|---|---|
| Last purchase: | Date | Jane Doe |
| Total purchases: | 2 (Last) | 12 (Past Year) |
| SkinCare (3) | | |
| ⊗(4) Ceramide Capsules<br>⊗(3) Millenium Cream<br>⊗(2) Perfection Cream | 30 Jan<br>30 Nov<br>30 Nov | Purchased<br>Purchased<br>Purchased |
| Color (2) | | |
| ⊗(1) Flawless Finish (121)<br>⊗(1) Exceptional Lipstick (906) | 30 Jan<br>30 Dec | Purchased<br>Purchased |
| Fragrance (1) | | |
| ⊗(1) Sunflowers<br>⊗(1) Red Door | 30 Oct<br>30 Sep | Purchased<br>Purchased |
| Fragrance (1) | | |
| ⊗ Red Door<br>⊗ Exceptional Lipstick<br>⊗ Perfection Cream | 30 Jan<br>30 Jan<br>30 Jan | Sampled<br>Recommended<br>Non-Appropriate |

⊗ - Denotes product type icon

FIG. 16

| Pop-up 16 | Pop-up 17 | Pop-up 18 | Pop-up 19 |
|---|---|---|---|
| Probe Calibration | Switch to Set Cal. Plate | Ready to Read Color Tile | Color Reading in Progress... |
| Probe Calibration Probe not calibrated! | Turn color reader off and on. Reader display should read 'Set Cal. Plate' Press (Enter) when ready! | Place Color Reader on the White Plate. Press (Enter) when ready! | Press button on color reader twice slowly To record calibration color |
| Warning: Skin Reader not calibrated - Continue anyway? (Y or N) | Cancel | Enter | Stop! Probe calibrated, OK to continue? |
| | Enter | | Continue |

FIG. 17

| Recommended Flawless Finish Foundation | | |
|---|---|---|
| Product | Color | |
| Mousse | 234 | [Recommend] |
| Hydrolight | 123 | [Purchase] |
| Pressed Powder | Medium 2 | [Sample] |
| | | |
| | | [Accept] |

FIG. 18

| | | | |
|---|---|---|---|
| Update Doors | Yes | No | |
| Update Product List | Yes | No | |
| Export new Clients | Yes | No | [Import Update File] |
| | | | [Create Update File] |
| Clean returns database | Yes | No | [Print Returns] |
| Delete entries more than | 3 months | | |
| | 6 months | | [Connect] |
| | 9 months | | [Close] |
| | 12 months | | |

FIG. 19

Language Selection

[English]

[Spanish]

[French]

FIG. 20

Search for Customer

| Name: | |
|---|---|
| List of Names | Information On Selected Customer |

[ACCEPT]
[NEW CUSTOMER]
[CANCEL]

FIG. 21

Treatment/Color Product Options

| Product | Color |
|---|---|
| Skin Illuminating Complex | |
| Millenium Night | |
| Millenium Energist | |

[ ]Treatment
[ ]Color
[ ]Fragrance

[Recommend]
[Purchase]
[Sample]
[Not appropriate]

[What's New]

[ACCEPT]
[CANCEL]

Advertisement Video

Store:
Consultant:
Date:

138

EYESHADOW
EYELINER
LIPSTICK
LIPLINER
BLUSH
FOUNDATION
POWDER

SYSTEM FOR ASSISTING CUSTOMERS IN SELECTING AN OPTIMUM COLOR COSMETIC PRODUCT

This application claims benefit of 60/142,600 filed Jul. 7, 1999.

BACKGROUND OF THE INVENTION

1. Field of the Invention

The invention concerns a method and implementing apparatus for assisting a customer in selecting color cosmetic products.

2. The Related Art

Color cosmetics are highly personal to an individual. An optimum shade is selected having relevance to a customer's skin coloration and to a color fancied by the customer.

Assistance in the selection of an optimal color shade is available to help the consumer. Clinque and Carlion have installed computers at sales counters for use by customers. Information on color, shade, oiliness and other properties of a customer's skin are punched into the computer which then determines the company's most closely matching product. Two major companies, Prescriptives (Division of Estee Lauder) and Visage (Division of Revlon) have for some time practiced a manual system for evaluating a subject's skin color. The sales person is trained through the use of match cards to identify a user's matching skin foundation. Unfortunately manual systems suffer from poor reproducibility. Extensive training must also be invested in a sales person.

German patent 41 10 299 C1 (Erdtmann) discloses use of a facial sensor for reading skin property values and then utilizing the measured values in selecting an optimum skin product. Subsequently, the information is sent to an automatic cosmetic dispensing system for blending selected additives to formulate the selected product.

U.S. Pat. No. 5,622,692 (Rigg et al.) reports a system for customizing a facial foundation product at point of sale to a customer. Three essential elements are present. They include a skin analyzer for reading skin properties, a programmable device receiving the reading and correlating same with an optimal formula and a formulation machine for preparing the facial foundation product from various cosmetic chemical compositions. Technology described in this patent has commercially been embodied in Elizabeth Arden's Custom Color system available for many years in major department stores. Arden's system has been a significant advance in the art. Yet it suffers from certain deficiencies including the inability of customers to evaluate different color cosmetics in the context of their own skin coloration and in juxtaposition to combinations of different facial makeover products. Thus it would be desirable to have visualized a lipstick and a foundation, eye shadow and/or blush on a color interactive basis. Especially desirable would be to evaluate the interaction of the various color cosmetics without actually having to place these on one's own face.

Accordingly, it is an object of the present invention to provide a system and apparatus for selecting a facial color cosmetic scheme from a palette of different shades and makeup products without requiring the actual placement of these products on the customer's face.

Another object of the present invention is to provide a system and apparatus for selecting a facial color cosmetic scheme allowing rapid visualization of different colored makeup permutations on various areas of the face in a simultaneous manner.

SUMMARY OF THE INVENTION

A method is provided for selecting a facial cosmetic color scheme, the method including:

(i) providing a computer module including a color monitor screen and a spectrophotometer;

(ii) measuring a customer's facial color with the spectrophotometer;

(iii) transmitting information on the measured facial color to the computer module for display of that color on a model face generated on the monitor screen;

(iv) allowing the customer to select at least one area of the face to be colored with a color cosmetic product; and (v) colorizing the area of the model face with the selected color.

Optionally a further step may be added involving printing on paper the colorized display from step (v) appearing on the monitor. By this method, a customer can select eye shadow, eye liner, lipstick, lip liner, blush, foundation and/or powder with selected colors, at least some of the combination having been first evaluated on a model face generated on the computer monitor screen. A program controlling the color and selection scheme can further be included to correlate a vendor's products which will achieve the selected color palette.

Also provided is a system for selecting a facial color cosmetic scheme, the system including:

(i) a computer module connected with a color monitor screen;

(ii) a spectrophotometer for measuring skin color;

(iii) a mechanism for transfer of facial color data obtained from measurements with the spectrometer over to the computer module and transmission onto the monitor screen; and (iv) an interactive program displayed on the monitor allowing the customer to select at least one color for application to an area of a model face appearing on the monitor.

BRIEF DESCRIPTION OF THE DRAWING

The various objects, features and advantages of the present invention will become more readily apparent from consideration of the following drawing in which:

FIG. 2 shows Screen 2 of the program;

FIG. 3 shows Pop-Up Screen 3 of the program;

FIG. 4 shows Pop-Up Screen 4 of the program;

FIG. 5 shows Overlay 5 of the program;

FIG. 6 shows Screen 6 of the program;

FIG. 7 shows Overlay 7 of the program;

FIG. 8 shows Pop-Up Screen 8 of the program;

FIG. 9 shows Pop-Up Screen 9 of the program;

FIG. 10 shows Pop-Up Screen 10 of the program;

FIG. 11 shows Pop-Up Screen 11 of the program;

FIG. 12 shows Pop-Up Screen 12 of the program;

FIG. 13 shows Pop-Up Screen 13 of the program;

FIG. 14 shows Pop-Up Screen 14 of the program;

FIG. 15 shows Overlay Screen 15 of the program;

FIG. 16 shows Pop-Up Screen 16 through 19 of the program;

FIG. 17 shows Pop-Up Screen 20 of the program;

FIG. 18 shows Pop-Up Screen 21 of the program;

FIG. 19 shows Pop-Up Screen 22 of the program;

FIG. 20 shows Pop-Up Screen 23 of the program;

FIG. 21 shows Screen 24 of the program;

DETAILED DESCRIPTION OF THE INVENTION

Now it has been found that a customer can evaluate how different color cosmetics can interact by first visualizing different colors on different areas of the face through computerized painting of a model face upon a monitor screen. In this system a customer is allowed to select colors to be placed on different areas of the model face. A reiterative procedure then occurs. This involves the customer selecting a color, having the program paint the selected color onto the stylized model face and then allowing the customer to evaluate the result. No longer must a customer actually try the product on their own face. A very rapid and clean evaluation can occur through use of the visualized model face.

Figure 24:
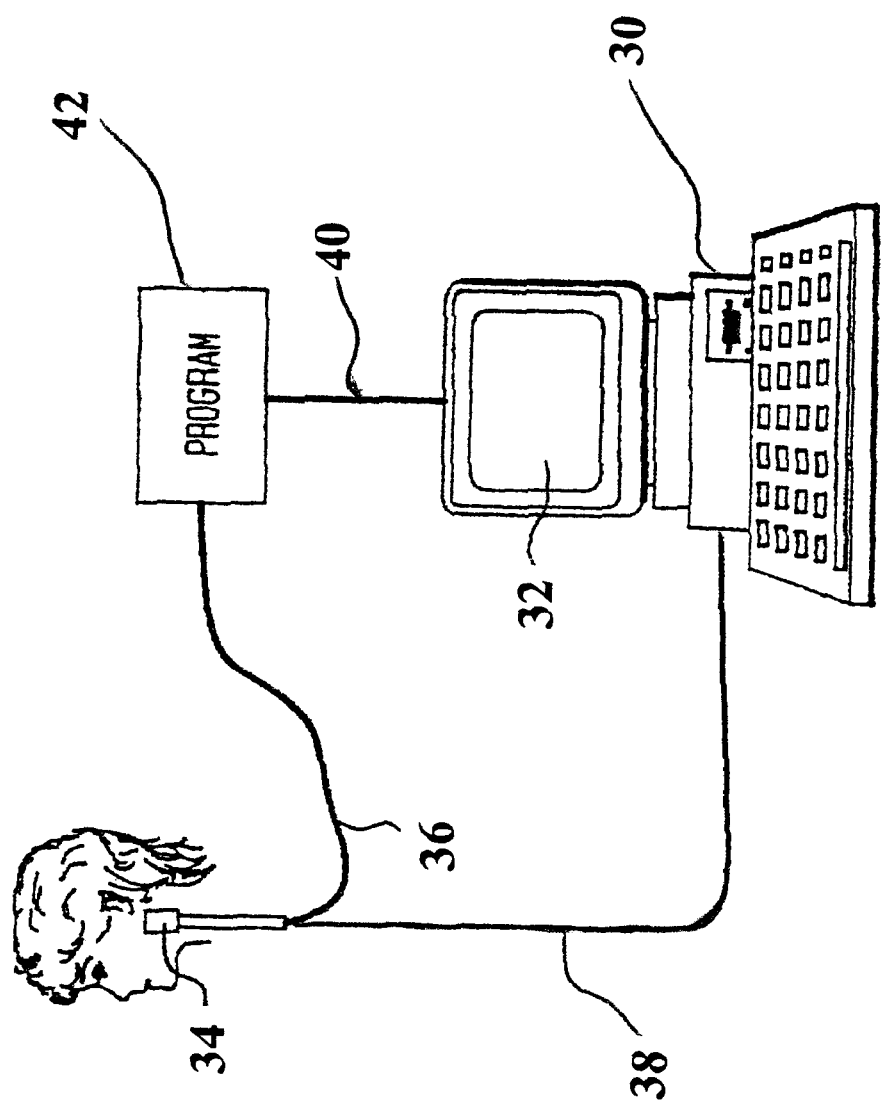
FIG. 24 shows a system including a computer, a monitor screen, a spectrophotometer, and cable connections for implementing the program according to the invention.

Referring to FIG. 24, the system is disclosed and includes a computer 30, a monitor screen 32, a spectrophotometer 34, and cable connections 36, 38, 40 for implementing a program 42 as described in conjunction with FIGS. 1–23.

A customer's actual facial color can be measured by a spectrophotometer/colorimeter of a type having a visible light source, such as light emitting diodes (LED), xenon-arc, tungsten-halogen and similar type in the wavelength range of 400–900 nm. The visible light source may form the sensor portion of the spectrophotometer/colorimeter. Both visible and infrared wavelength light may be utilized in connection with the sensor portion. Suitable skin analyzers are commercially available from Minolta Camera Co. Ltd., Japan and from Colortec Associates. Actual skin color normally is measured around neckline areas which are free of a customer's foundation or other coverup cosmetics. Measurement starts by cleaning the areas preparatory to a reading. The spectrophotometer/colorimeter is then placed in proximity to the cleaned facial area. Visible light emitted in the 400–900 nm range by the device will be reflected off the skin surface and the reflective wavelength measured. It is recommended that at least five skin readings along the neck/jaw line region be taken. Total time for the reading requires approximately 30 seconds. A cable connecting the spectrophotometer/colorimeter to the computer module transmits the measured information on L, a and b thereby inputting a customer's natural skin color parameters into the database. Alternatively the measured values can be read by the measuring consultant directly off the spectrophotometer/colorimeter and manually banked into the computer module by typing the information on a linked keyboard.

By the term "computer module" is meant any programmable device capable of processing information. Normally these are personal computers.

Figure 1:
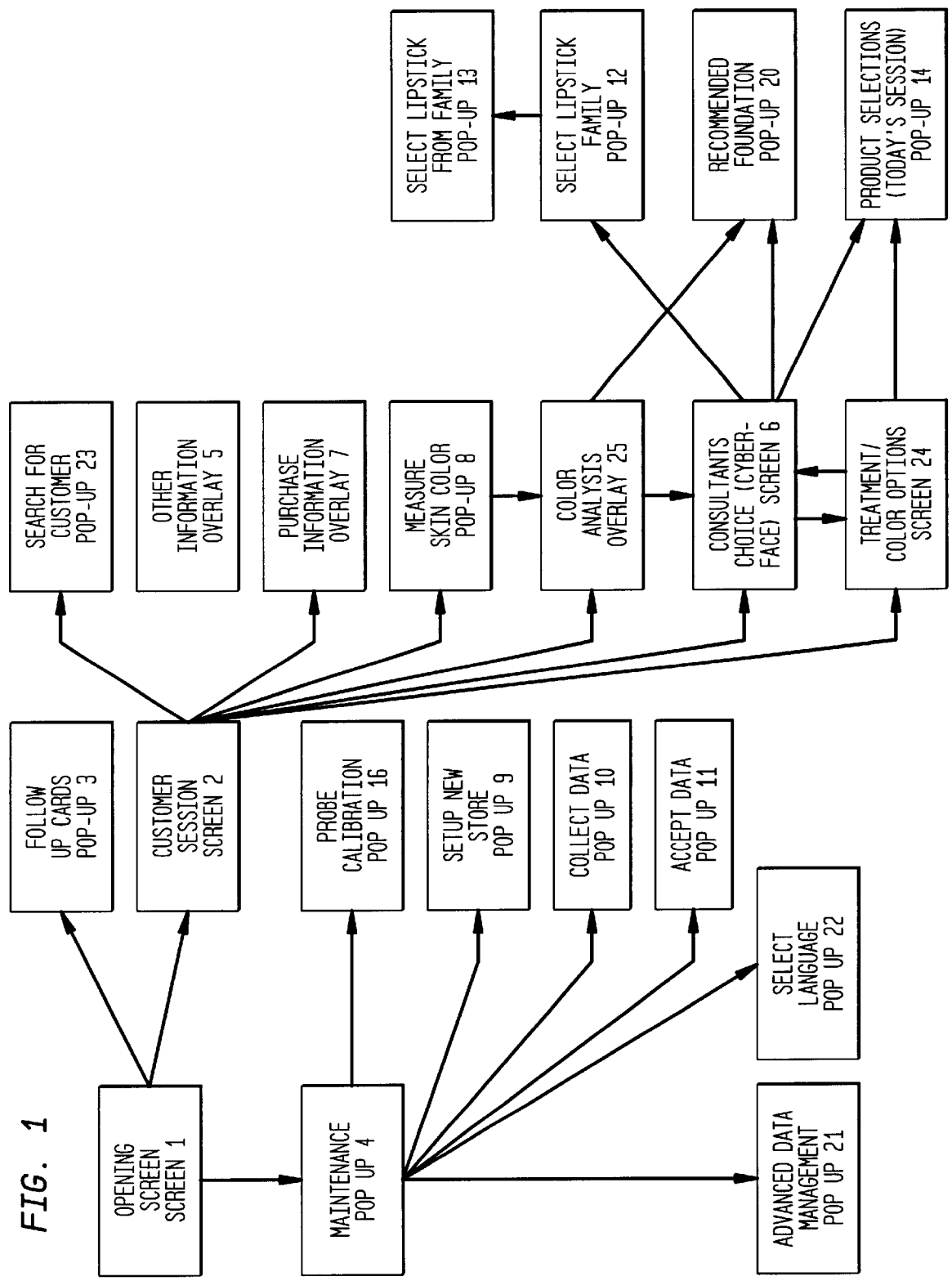
FIG. 1 shows a flow chart diagramming a program used in the system of the invention for selecting facial color cosmetic schemes.

FIG. 1 is a flow chart of a program according to one embodiment of this invention. After the opening screen, a user is introduced to Screen 2 known as the 'customer session'. Client information is obtained via this screen through either a swipe card, entry via a keyboard or from a database. The screen remains active (buttons are available) when overlays are displayed. FIG. 1 provides a view of Screen 2.

A Pop-up Screen 3 next appears with comments and client information to prompt follow-up calls. This screen can be used for contacting the client to remind them to visit the store when their cosmetic supply may be low. FIG. 3 illustrates the screen.

Pop-up Screen 4 covering 'Maintenance' is then available for appearance. This pop-up screen has options for calibration and data handling. FIG. 4 sets forth the screen.

Other information is collected with Overlay Screen 5. The Overlay screen selects/changes information about skin, beauty habits, type and brand of products used. Overlay Screens 2 and the buttons on Screen 2 remain active. FIG. 5 describes Overlay Screen 5.

Screen 6 provides a 'Consultant's Choice'. This screen shows effects of color palette, using client's skin color. Information on the client's skin color is obtained through application of a hand-held spectrophotometer against areas of the face not likely to be covered by makeup. These areas include the neck and under chin areas. The cosmetic 'look' can either be based on skin color (skin recommendation), lipstick color (color family), or a specific look. Depending on selections, a list of typically five 'looks' is created, and selecting (another look) displays next look in the series. FIG. 6 sets forth Screen 6.

Purchase information is achieved in Overlay Screen 7. This screen with previous and current purchase information (overlay to screen 2) is ordered by visit date. It contains information from up to the last five visits. Purchase information includes number, product type, product name and product number. FIG. 7 sets forth the purchase information screen.

Pop-up Screen 8 measures skin color. It consists of a series of screens to assist an adviser with color measurement. This session is repeated three times. FIG. 8 depicts the Pop-up Screen 8.

Pop-up Screen 9 serves to obtain information for a new store. It is used by the installation team to correctly set up the store-specific parameters. FIG. 9 describes the Pop-up Screen 9.

Collection of data for the main office is found in Pop-up Screen 10. Data is placed in a store's outbox, and can then be transferred in three ways. These include: (1) remote computer can dial in and retrieve file from outbox; (2) transfer information to a server automatically using PC-anywhere script; and/or (3) copied to floppy disk and mailed to central site. FIG. 10 illustrates the Pop-up Screen 10.

Pop-up Screen 11 copies data from other stores. It can accept data in two ways. These include: (1) update using floppy supply by the main office; or (2) use of pc/Anywhere script to retrieve update file from main office outbox. FIG. 11 illustrates the Pop-up Screen 11.

Pop-up Screen 12 allows selection of a color lipstick family. The customer advisor can either enter a specific lipstick number, or choose a color family, then choose a color from the family. The active color palette will consist of individual palettes that contain that lipstick. The advisor can also enter a specific look (can be either from a previous visit or any of the available looks in the palette). FIG. 12 describes the pop-up Screen 12.

Pop-up Screen 13 allows selection of lipstick from a color family (as selected from Pop-up Screen 12). If the lipstick is also in the palette recommendation based on skin tone, the color is put first in the list, and (expert fit) is added to the name. FIG. 13 describes the Pop-up Screen 13.

Pop-up 14 shows product selections (treatments in cosmetic colors) made during the present session. Product selections can be made during color viewing (Screen 6), treatment/product options (Overlay 24) or Recommended Foundation (Pop-up Screen 20). There also is a display of recommended looks. FIG. 14 describes the Pop-up Screen 14.

Overlay Screen 15 is used to provide a snapshot of the type of customer. For detail purchase history, Overlay 7 provides the purchase information. Included in this screen are key purchase properties, group by type, over the past twelve months. It is automatically displayed for each customer. FIG. 15 lists the Overlay Screen 15.

Pop-up Screen 16 is a probe for calibration/routine and for messages to calibrate probe. FIG. 16 details the Pop-up Screens 16–19.

Pop-up Screen 20 is used to recommend the best foundation product combination based on skin color and product preferences. FIG. 17 details the Pop-up Screen 20.

Pop-up Screen 21 is an advanced data management module. This is used by the main office. FIG. 18 details the Pop-up Screen 21.

Pop-up Screen 22 relates to language selection. FIG. 19 details Pop-up Screen 22.

Pop-up Screen 23 is used to locate and activate a client. If this is a new client, the 'new' button is clicked to create the new client file. FIG. 20 details Pop-up Screen 23.

Screen 24 details treatment/color/fragrance options showing all the option products. FIG. 21 details Screen 24.

Figure 22:
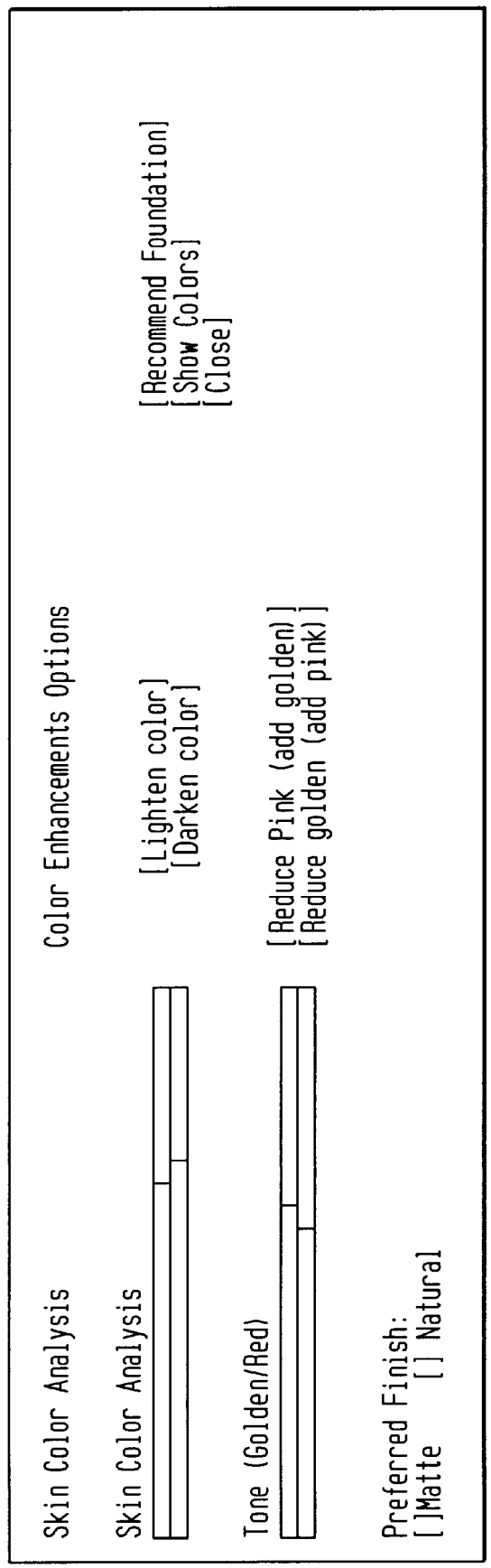
FIG. 22 shows Overlay 25 of the program.
Figure 23:
FIG. 23 shows a printout of a stylized model face provided as a printout from the method according to the present invention including recommendation for various different types of color cosmetics.

Overlay 25 focuses on skin color analysis allowing selection of shade and tone. FIG. 22 details the Overlay 25.

The foregoing description illustrates selected embodiments of the present invention. In light thereof variations and modifications will be suggested to one skilled in the art, all of which are within the spirit and purview of this invention.

What is claimed is:

1. A method for selecting a facial color cosmetic scheme, the method comprising:

(i) providing a computer module including a color monitor screen and a spectrophotometer;

(ii) measuring a customer's facial color with the spectrophotometer;

(iii) transmitting information on the measured facial color to the computer module for display of that color on a model face generated on the monitor screen;

(iv) allowing the customer to select at least one area of the face to be colored with a color cosmetic product; and (v) colorizing the area of the model face with the selected color.

2. The method according to claim 1 further comprising the steps of printing in color on paper the displayed model face via a printer.

3. The method according to claim 1 wherein areas of the face to be colorized are those selected from the group consisting of the lips, eyelashes, eyelid, cheeks and combinations thereof.

4. The method according to claim 1 wherein a program operated by the computer module stores information on a vendor's products which will achieve the selected color when placed upon the selected area of the face.

5. A system for selecting a facial color cosmetic scheme, the system comprising:

(i) a computer module connected with a color monitor screen;

(ii) a spectrophotometer for measuring skin color;

(iii) a mechanism for transfer of facial color data obtained from measurements with the spectrophotometer over to the computer module and transmission onto the monitor screen; and (iv) an interactive program displayed on the monitor screen allowing a customer to select at least one color for application to an area of a model face appearing on the monitor screen.

* * * * *